(12) United States Patent
Fortoloczki

(10) Patent No.: US 11,077,543 B2
(45) Date of Patent: Aug. 3, 2021

(54) APPARATUS FOR TIGHTENING THREADED FASTENERS

(71) Applicant: HYTORC Division UNEX Corporation, Mahwah, NJ (US)

(72) Inventor: Peter E. Fortoloczki, Essex Fells, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 36 days.

(21) Appl. No.: 16/324,792

(22) PCT Filed: Aug. 8, 2017

(86) PCT No.: PCT/US2017/045937
§ 371 (c)(1),
(2) Date: Feb. 11, 2019

(87) PCT Pub. No.: WO2018/031566
PCT Pub. Date: Feb. 15, 2018

(65) Prior Publication Data
US 2019/0224836 A1    Jul. 25, 2019

Related U.S. Application Data

(60) Provisional application No. 62/371,900, filed on Aug. 8, 2016.

(51) Int. Cl.
*B25F 5/00* (2006.01)
*B25B 23/00* (2006.01)
*B25B 21/00* (2006.01)

(52) U.S. Cl.
CPC .............. *B25F 5/001* (2013.01); *B25B 21/00* (2013.01); *B25B 21/008* (2013.01); *B25B 23/0078* (2013.01)

(58) Field of Classification Search
CPC ....... B25F 5/001; B25B 21/00; B25B 21/008; B25B 21/0078
USPC ......................................................... 173/216
See application file for complete search history.

(56) References Cited

U.S. PATENT DOCUMENTS

| 5,339,908 A | * | 8/1994 | Yokota | B25B 23/141 173/216 |
| 2004/0020669 A1 | * | 2/2004 | Spielmann | B25F 5/001 173/178 |
| 2005/0279198 A1 | * | 12/2005 | Kushida | B25B 21/00 81/469 |

(Continued)

*Primary Examiner* — Nathaniel C Chukwurah
(74) *Attorney, Agent, or Firm* — Justin B. Bender, Esq.

(57) ABSTRACT

The present invention seeks to protect Applicant's HYTORC® LITHIUM SERIES™ Torque Gun Tools for tightening and/or loosening of industrial threaded fasteners. Such tools include: a drive input and output assembly; a turning force multiplication assembly; a dual drive output and reaction assembly; and a yoke-style shifting assembly for any torque mode from lower and/or higher resistance and/or speed. A preferred embodiment includes an electric motor of the drive input and output assembly powered by a battery pack. Advantageously, the yoke-style shifting assembly: improves and simplifies design and operation of shifting; reduces tool size and cost; and increases tool portability, efficiency, reliability and repeatability, all without sacrificing Applicant's many innovations in hand-held, multispeed torque intensifying tools.

19 Claims, 2 Drawing Sheets

(56) References Cited

U.S. PATENT DOCUMENTS

| | | | |
|---|---|---|---|
| 2006/0162945 A1* | 7/2006 | Soderlund | B25F 5/001 173/216 |
| 2007/0201748 A1* | 8/2007 | Bixler | B25F 5/001 382/225 |
| 2008/0173459 A1* | 7/2008 | Kuroyanagi | B25F 5/001 173/216 |
| 2009/0098971 A1* | 4/2009 | Ho | F16H 61/0213 475/153 |
| 2010/0186978 A1* | 7/2010 | Sekino | B25B 21/00 173/48 |
| 2013/0025899 A1* | 1/2013 | Kuehne | B25F 5/001 173/216 |

* cited by examiner

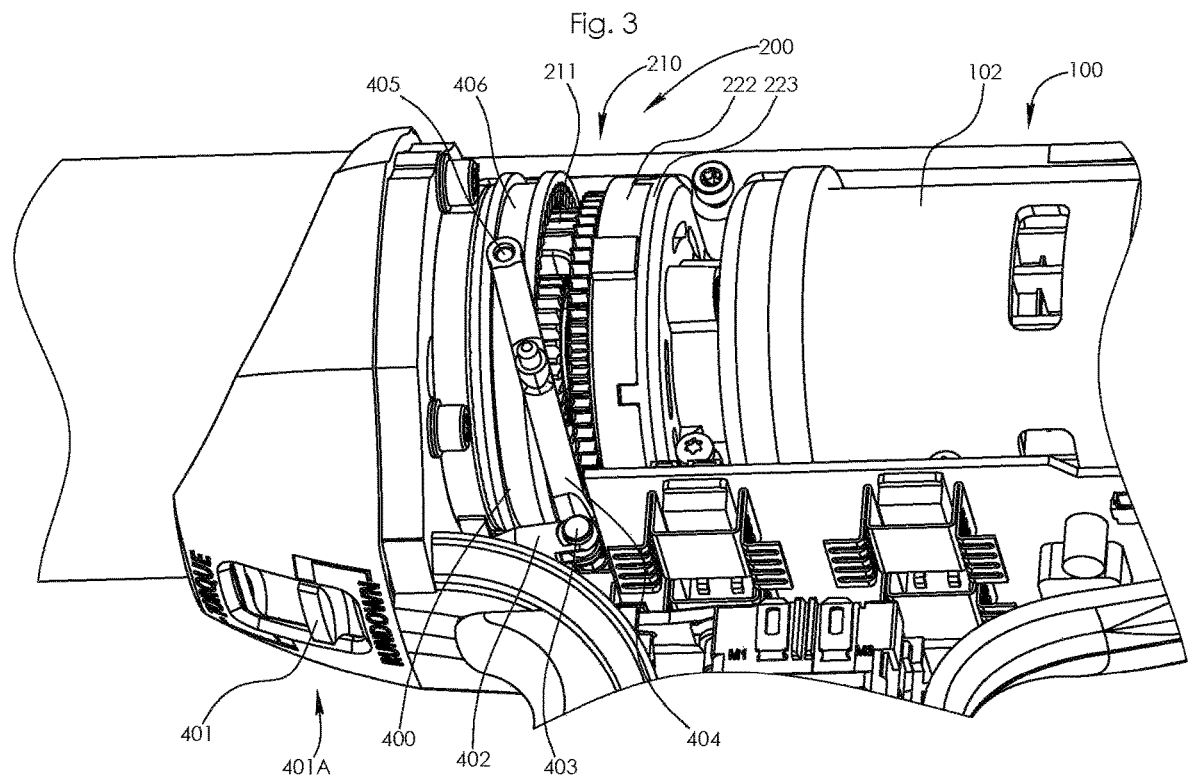
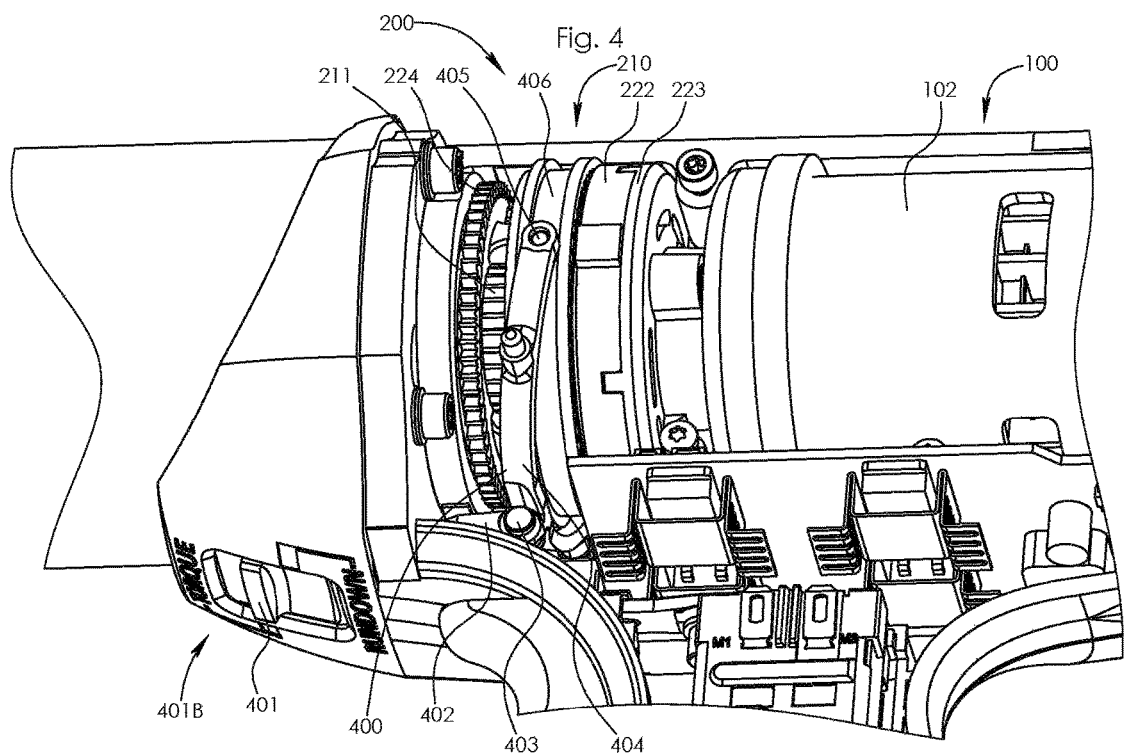

APPARATUS FOR TIGHTENING THREADED FASTENERS

CROSS REFERENCE TO RELATED APPLICATIONS

This Application either claims priority to and/or is either a continuation patent application or a continuation-in-part application of the following commonly owned and co-pending patent application, an entire copy of which is incorporated herein by reference: U.S. Application Ser. No. 62/371,900, having Filing Date of 8 Aug. 2016, entitled "APPARATUS FOR TIGHTENING THREADED FASTENERS".

BACKGROUND

Threaded fasteners including bolts, studs, nuts and washers are known and used in traditional bolting applications. Maintenance and repair of industrial applications begin with loosening of and end with tightening of these threaded fasteners. Naturally industry seeks to reduce production loss during routine, unforeseen and/or emergency startup, maintenance and/or repair.

High torque values are often required for industrial bolting applications. These high torque values are often generated from relatively small, portable hydraulically, electrically and pneumatically driven tools with relatively large gear reduction ratios. These large gear reduction ratios multiply output torque from a power source of the tool through either one or a plurality of planetary gear stages. The caveat to creating high torque values from small portable tools is the driving speed is quite slow. This slow driving speed makes turning a nut for anything other than final torque arduous and time consuming. Historically, operator needed another device simply to run down and seat a nut on a stud or bolt prior to the final torqueing sequence.

Once the nut is seated on the flange surface the turning degree to tighten or loosen it up is relatively small. Customers desire high turning speeds to quickly run down or up nuts. Known impact wrenches, which provided a high run down and run off speed, had disadvantages of inaccuracy and slow rotation once the nut hit the flange face. Conversely, known handheld torque power tools were torque accurate, but relatively slow in run up and run down of fasteners. Still they were much faster than impact guns once the nut was turned on the flange face.

Applicant applied its thorough understanding and innovation in torque power tools to hand-held pneumatic torque intensifying tools, specifically by creating the HYTORC® jGUN®, HYTORC® FLIP-GUN®, HYTORC® THRILL®, HYTORC® Z®, and HYTORC® FLASH® product lines and drivers and accessories for use therewith. Evolution of these product lines and drivers and accessories for use therewith is disclosed, for example, in Applicant's U.S. Pat. Nos. and U.S. application Ser. Nos.: U.S. Pat. Nos. 6,490,952; 6,609,868; 6,929,439; 6,883,401; 6,986,298; 7,003,862; 7,066,053; 7,125,213; 7,188,552; 7,207,760; 7,735,397; 7,641,579; 7,798,038; 7,832,310; 7,950,309; 8,042,434; D608,614; Ser. Nos. 13/577,995; 15/106,221; and 15/106,247, entire copies of which are incorporated herein by reference.

Several of Applicant's tools include a higher speed/lower torque (HSLT) mode for the run up or run down of the nut and a lower speed/higher torque (LSHT) mode for the final torqueing sequence. Applicant's use of a "lock out" stage in in HSLT mode for multistage planetary gearboxes, thereby increasing rotation speed by the factor of the ratio being locked out, has proved a highly effective design. Efficient, reliable and repeatable shifting between two modes under extreme conditions during testing and in the field, however, continues to present challenges. Applicant wishes to continue improving its shifting mechanisms.

Further, Applicant's tools have been powered hydraulically, electrically, pneumatically and manually requiring an external power source which increases size and decreases portability. Tool size and portability continue to present challenges, both during development and in the field. Applicant wishes to incorporate, without sacrifice, its many innovations into a battery-operated, multi-speed, hand-held torque intensifying tool to minimize size and maximize portability.

What is needed is simplification in tool design and operation; reduction in tool size; and increased tool portability, efficiency, reliability and repeatability, all at low cost. The present invention(s) has therefore been devised to solve these issues.

SPECIFICATION

The invention(s) of the present application may be described by way of example only with reference to the accompanying drawings, of which:

FIG. 3 is a partial perspective view of the HYTORC® LITHIUM SERIES™ Torque Gun Tool in the higher speed/lower torque mode; and FIG. 4 is a partial perspective view of the HYTORC® LITHIUM SERIES™ Torque Gun Tool in the lower speed/higher torque mode.

Figure 1:
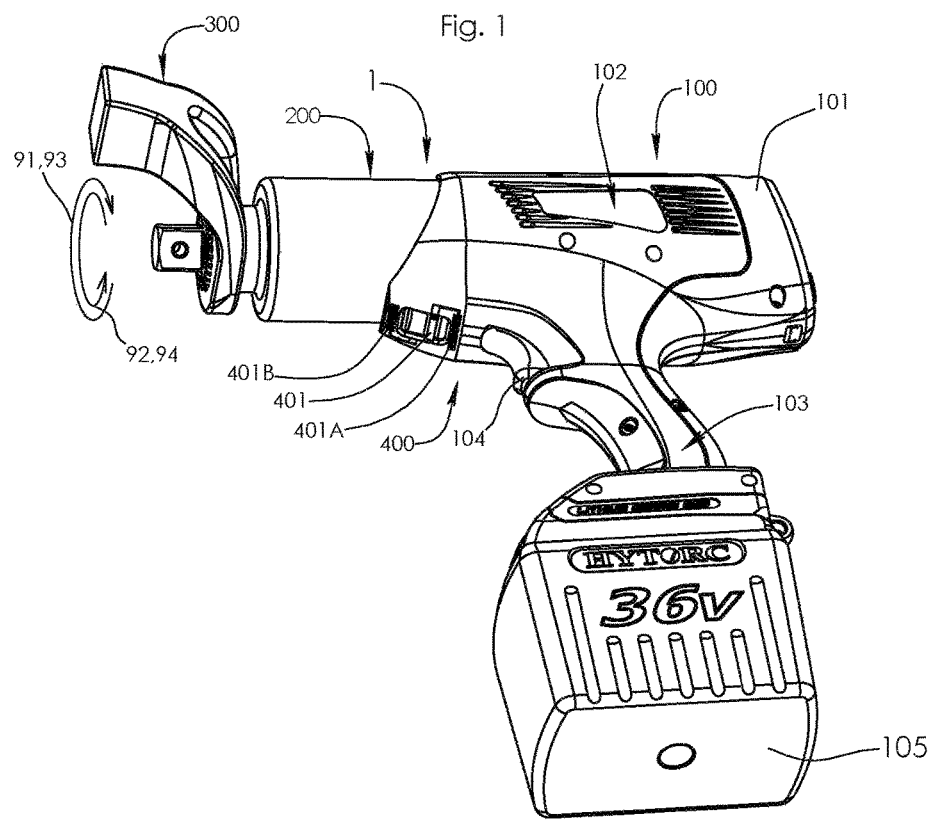
FIG. 1 is a full perspective view of Applicant's HYTORC® LITHIUM SERIES™ Torque Gun Tool.

Referring to FIG. 1 by way of example, this shows a full perspective view of a HYTORC® LITHIUM SERIES™ Torque Gun Tool 1 for tightening and/or loosening of industrial threaded fasteners. Tool 1 includes: a drive input and output assembly 100; a turning force multiplication assembly 200; a dual drive output and reaction assembly 300; and a yoke-style shifting assembly 400 for any torque mode from lower and/or higher resistance and/or speed. A preferred embodiment of tool 1 includes an electric motor 102 of drive input and output assembly powered by a battery pack 105. Advantageously, yoke-style shifting assembly 400: improves and simplifies design and operation of shifting; reduces tool size and cost; and increases tool portability, efficiency, reliability and repeatability, all without sacrificing Applicant's many innovations in hand-held, multispeed torque intensifying tools.

FIG. 1 shows parts of drive input and output assembly 100 of tool 1. Drive input components include drive tool housing 101 containing a drive generating mechanism 102, handle assembly 103, and a switching mechanism 104. Drive generating mechanism 102 generates torque turning force 91 in one direction 93 to turn a nut (not shown) and is shown formed as a motor drive means which may include either a hydraulic, pneumatic, electric or manual motor. In this preferred embodiment, drive generating mechanism 102 is an electric motor powered by a battery pack 105. Drive tool housing 101 is shown generally as a cylindrical body with handle assembly 103 which is held by an operator. Handle assembly 103 includes switching mechanism 104 for switching drive generating mechanism 102 between an inoperative position and an operative position, and vice-versa.

Figure 2:
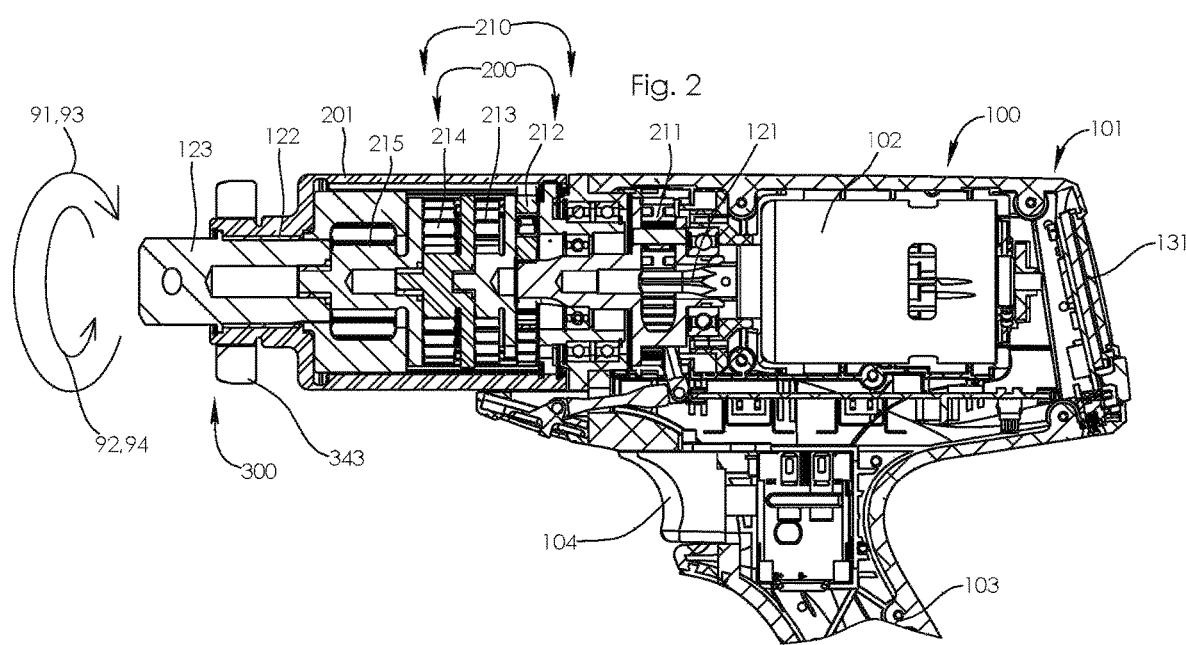
FIG. 2 is a cross-sectional view of Applicant's HYTORC® LITHIUM SERIES™ Torque Gun Tool.

FIG. 2, by way of example, shows a cross-sectional perspective view of tool 1. A turning force input shaft 121 connects drive input components of drive input and output assembly 100 with turning force multiplication assembly 200 and transfers turning force 91 between the same. A turning force output shaft 122 includes a driving part 123, which can be formed for example as a square drive. Turning force output shaft 122 connects drive output components of drive input and output assembly 100 with turning force multiplication assembly 200 and transfers a multiplied form of turning force 91 between the same and dual drive output and reaction assembly 300. In one mode of operation a reaction force spline adaptor 343 receives torque reaction force 92 in the opposite direction 94. Note that turning force output shaft 122 and driving part 123 also make up portions of dual drive output and reaction assembly 300. Other components shown of drive input and output assembly 100 include a handle rear cover electronic control panel 131 and related electronics.

Turning force multiplication assembly 200 includes turning force multiplication mechanism 210 portions of which are found in drive tool housing 101 and in a turning force multiplication mechanism housing 201 for all torque modes from lower resistance to higher resistance. In the embodiment shown in FIG. 2, turning force multiplication assembly 200 includes five (5) multiplication transmitter assemblies, or gear stages, 211, 212, 213, 214 and 215. Tools of the present invention may include any suitable number of gear stages. It is to be understood that there are numerous known types of turning force multiplication mechanisms. While Generally turning force multiplication transmitter assemblies 211-215 make up a compound epicyclic gearing system. It may include a plurality of outer planetary gears revolving about central sun gears. The planetary gears may be mounted on movable carriers which themselves may rotate relative to the sun gears. Such compound epicyclic gearing systems may include outer ring gears which mesh with the planetary gears. Simple epicyclic gearing systems have one sun, one ring, one carrier, and one planetary set. Compound planetary gearing systems may include meshed-planetary structures, stepped-planet structures, and/or multi-stage planetary structures. Compared to simple epicyclic gearing systems, compound epicyclic gearing systems have the advantages of larger reduction ratio, higher torque-to-weight ratio, and more flexible configurations.

Turning force multiplication transmitter assemblies 211-215 may include: gear cages; planetary gears; ring gears; sun gears; wobble gears; cycloidal gears; epicyclic gears; connectors; spacers; shifting rings; retaining rings; bushings; bearings; caps; transmission gears; transmission shafts; positioning pins; drive wheels; springs; or any combination or portion thereof. Turning force multiplication transmitters such as 211-215 may include other known like components as well. Note that turning force input shaft 121 also may be considered a turning force multiplication transmitter; specifically it's a first stage motor sun gear of turning force multiplication transmitter 211. Turning force multiplication assemblies are well known and disclosed and described. An example is disclosed and described in Applicant's U.S. Pat. No. 7,950,309, an entire copy of which is incorporated herein by reference.

Referring to FIG. 3 by way of example, this shows a partial perspective view of tool 1 in HSLT mode with emphasis on relevant portions of turning force multiplication assembly 200 and yoke-style shifting assembly 400. One side of drive tool housing 101 is removed. Yoke-style shifting assembly 400 is substantially for shifting tool 1 from HSLT mode to LSHT mode and vice versa. A mode shifter switch 401 is movable between: a position 401A which places tool 1 in HSLT mode; and a position 401B which places tool in LSHT mode.

In the preferred embodiment shown in FIGS. 3 and 4, yoke-style shifting assembly 400 includes: mode shifter switch 401; a shifter yoke 404; and a shifter ring gear 406. A shifter rod 402 is formed between and operatively connects mode selector switch 401 and shifter yoke 404. A shifter clevis pin assembly 403 is formed between shifter rod 402 and shifter yoke 404 and a shifter yoke pin assembly 405 is formed between shifter yoke 404 and shifter ring gear 406. Referring to FIG. 4 by way of example, this shows a partial perspective view of tool 1 in LSHT mode with emphasis on relevant portions of turning force multiplication assembly 200 and yoke-style shifting assembly 400. Again one side of drive tool housing 101 is removed.

Yoke-style shifting assembly 400 may include: manual assemblies (sequential manual, non-synchronous or preselector) or automatic assemblies (manumatic, semi-automatic, electrohydraulic, saxomat, dual clutch or continuously variable); torque converters; pumps; planetary gears; clutches; bands; valves; connectors; spacers; shifting rings; retaining rings; bushings; bearings; collars; locking balls; caps; transmission gears; transmission shafts; synchronizers; connecting pins; positioning pins; drive wheels; springs; handles; grips; switches; actuators; brackets; splines; plugs; any such parts; or any combination or portion thereof. Mode shifting components may include other known like components as well. It is to be understood that there are various known mode-shifting assemblies, and often involve shifting components consisting of collars, rings and locking balls.

Tool 1 operates per the following. Generally in HSLT mode, an existing planetary stage is locked out or driven though. Tool 1 increases rotational speed equivalent to the magnitude of the locked out gear stage ratio. Likewise tool 1 output torque is reduced by approximately the same magnitude. Multiplication transmitter assembly, or first stage, 211, shares shifter ring gear 406 with yoke-style shifting assembly 400.

In the embodiment shown in FIGS. 1-4, shifter ring gear 406 has two positions corresponding to HSLT and LSHT modes. In HSLT mode, the operator pulls shifter selector switch 401 toward a rear position 401A. Shifter ring gear 406 engages an external carrier locking gear 224 of the same pitch and number of teeth that is part of a planetary stage carrier of first stage 211. In LSHT mode, the operator pushes shifter selector switch 401 toward a front position 401B. Shifter ring gear 406 engages an external mating stationary, or fixed, gear 222 of the same pitch and number of teeth that is grounded to drive tool housing 101 via a stationary ring gear adaptor 223. Yoke-style shifting assembly 400 achieves this by transforming linear displacement of shifter rod 402 by mode shifter switch 401 to rotatably slideable displacement of shifter yoke 404 to linear displacement of shifter ring gear 406.

Shifter ring gear 406 always engages with the planetary gears of first stage 211, regardless of position. Stationary gear 222 is engaged by shifter ring gear 406 during LSHT mode and first stage 211 operates normally. Shifter ring gear 406 is substantially half on planetary gears of first stage 211 and substantially half on stationary gear 222. Turning force 91 in one direction 93 leaves first stage 211 at a lower rate of rotation and a higher torque intensity than when it entered and is transferred to second multiplication transmitter assembly, or second stage, 212. Shifter ring gear 406 engages external carrier gear 224 and locks out first stage 211 during HSLT mode. Shifter ring gear 406 is substantially half on planetary gears of first stage 211 and substantially half on external carrier gear 224. First stage 211 is independently mounted on it's own bearings. First stage 211 is locked out in HSLT mode and spins at a substantially similar rate and intensity as drive generating mechanism 102 (an electric motor powered by battery pack 105). A non-intensified form of turning force 91 in one direction 93 is transferred to second stage 212.

The preferred embodiment of yoke-style shifting assembly 400 manipulates only first stage 211. Generally yoke-style shifting assemblies of the present invention and modified forms thereof can shift tools into any configuration of multiplication transmitters, and therefore any torque mode from lower and/or higher resistance and/or speed. The turning force output and/or rotation speed of the motor is either increased, decreased and/or maintained by means of epicyclic gear stages or the like. They may be: stand alone components; multiplication transmitter assemblies and part of the multiplication mechanism assembly; adjacent to the motor; part of the motor; and/or or extensions of the motor. Generally yoke-style shifting assemblies of the present invention temporarily disable one and/or a plurality of such intensification and/or reduction mechanisms to increase and/or decrease the tool motor rotation speed and/or turning force intensity.

Note that tools of the present invention may include the ability to tighten and/or loosen industrial threaded fasteners by any known method, including: torque; traditional tension; mechanical tension; and/or turn of nut, or toque and angle.

A system for fastening objects includes a threaded fastener; and a torque power tool described herein. Another system for fastening objects includes a torque power tool described herein; and any novel feature or method or novel combination of features or methods described in the following commonly owned and co-pending patent applications, entire copies of which are incorporated herein by reference: Patent Cooperation Treaty Application Serial No. PCT/US2014/071000, having Filing Date of 17 Dec. 2014, entitled "APPARATUS FOR TIGHTENING THREADED FASTENERS"; Patent Cooperation Treaty Application Serial No. PCT/US2014/035375, having Filing Date of 24 Apr. 2014, entitled "APPARATUS FOR TIGHTENING THREADED FASTENERS"; U.S. Application Ser. No. 61/940,919, having Filing Date of 18 Feb. 2014, entitled "APPARATUS FOR TIGHTENING THREADED FASTENERS"; U.S. application Ser. No. 13/577,995, having Filing Date of 9 Aug. 2012, entitled "APPARATUS FOR TIGHTENING THREADED FASTENERS"; and U.S. application Ser. No. 13/113,693, having Filing Date of 23 May 2011, entitled "METHOD FOR TIGHTENING AND LOOSENING THREADED CONNECTORS". Further, any novel feature or novel combination of features described herein with reference to and as shown in the accompanying drawings is protected.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. Note that there may be slight differences in descriptions of numbered components in the specification.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. A torque power tool for tightening and/or loosening of an industrial threaded fastener including:
    a motor to generate a turning force;
    a drive to transfer the turning force;
    a turning force multiplication mechanism assembly having one or more gear stages;
    a yoke-style shifter assembly to shift the tool between a higher speed/lower torque (HSLT) mode and a lower speed/higher torque (LSHT) mode;
    wherein in during the HSLT mode, a shifter ring gear of the yoke-style shifter assembly engages an external carrier locking gear of a first gear stage; and
    during the LSHT mode, the shifter ring gear engages an external mating stationary gear that is grounded to a drive tool housing via a stationary ring gear adaptor.

2. A torque power tool according to claim 1 electronically driven and powered by a battery pack.

3. A torque power tool according to claim 2 wherein the yoke-style shifter assembly includes a shifter rod formed between the mode selector switch and the shifter yoke.

4. A torque power tool according to claim 3 wherein the yoke style shifter assembly includes:
    a shifter clevis pin formed between the shifter rod and the shifter yoke; and
    a shifter yoke pin formed between the shifter yoke and the shifter ring gear.

5. A torque power tool according to claim 1 either electronically, hydraulically, pneumatically or manually driven.

6. A torque power tool according to claim 1 wherein the yoke-style shifter assembly includes:
    a mode shifter switch; and
    a shifter yoke.

7. A torque power tool according to claim 1 wherein the yoke-style shifter assembly is movable between a first position which places the tool in the HSLT mode and a second position which places the tool in the LSHT mode.

8. A torque power tool according to claim 1 wherein the yoke-style shifting assembly transforms linear displacement of a shifter rod by a mode shifter switch to rotatably slideable displacement of a shifter yoke to linear displacement of the shifter ring gear.

9. A torque power tool according to claim 1, wherein the shifter ring gear and the external carrier locking gear have the same pitch and number of teeth, and wherein the shifter ring gear and the external mating stationary gear have the same pitch and number of teeth.

10. A torque power tool according to claim 1 wherein the shifter ring gear of the yoke-style shifter assembly always engages with planetary gears of the first gear stage, regardless of torque mode.

11. A torque power tool according to claim 1 wherein the stationary gear is engaged by the shifter ring gear during the LSHT mode when the first gear stage operates normally.

12. A torque power tool according to claim 1 wherein the external carrier gear is engaged by the shifter ring gear and locks out the first gear stage during a HSLT mode.

13. A torque power tool according to claim 1 wherein the shifter ring gear is positioned substantially half on planetary gears of the first gear stage and substantially half on the stationary gear in the HSLT mode.

14. A torque power tool according to claim 1 wherein the shifter ring gear is positioned substantially half on planetary gears of the first gear stage and substantially half on the external carrier gear in the HSLT mode.

15. A torque power tool according to claim 1 wherein the first gear stage is independently mounted on it's own bearings.

16. A torque power tool according to claim 1 wherein a turning force in one direction leaves the first gear stage at a lower rate of rotation and a higher torque intensity than when it entered and is transferred to a second gear stage in the LSHT mode.

17. A torque power tool according to claim 1 wherein a turning force in one direction leaves the first gear stage at a substantially similar rate of rotation and a substantially similar torque intensity than when it entered and is transferred to a second gear stage in the HSLT mode.

18. A torque power tool according to claim 1 including three or more torque modes from lower and/or higher resistance and/or speed.

19. A system for fastening objects including:
a threaded fastener; and
a torque power tool of claim 1.

* * * * *